United States Patent
Jones

(12)
(10) Patent No.: US 6,568,441 B2
(45) Date of Patent: May 27, 2003

(54) HOLDING ARMS FOR SHAPER CUTTING AND THE LIKE

(76) Inventor: Gary L. Jones, 680 Lowel, Marietta, GA (US) 30008

( * ) Notice: Subject to any disclaimer, the term of this patent is extended or adjusted under 35 U.S.C. 154(b) by 0 days.

(21) Appl. No.: 10/116,446

(22) Filed: Apr. 4, 2002

(65) Prior Publication Data

US 2002/0144752 A1 Oct. 10, 2002

Related U.S. Application Data

(60) Provisional application No. 60/281,835, filed on Apr. 5, 2001.

(51) Int. Cl.$^7$ .............................................. B27B 31/00
(52) U.S. Cl. ................... 144/253.2; 83/448; 144/253.3; 144/253.6; 144/250.15; 269/166
(58) Field of Search .................. 83/444, 446, 448, 83/449; 144/253.1, 253.2, 253.3, 253.6, 250.13, 250.15, 250.16; 269/6, 166, 254 CS

(56) References Cited

U.S. PATENT DOCUMENTS

| | | | | |
|---|---|---|---|---|
| 208,323 A | * | 9/1878 | Mayo | 144/250.15 |
| 481,983 A | * | 9/1892 | Thom | 144/253.6 |
| 2,722,247 A | * | 11/1955 | Schroeder et al. | 144/250.16 |
| 2,830,629 A | * | 4/1958 | Deiters | 144/253.6 |
| 4,624,294 A | * | 11/1986 | Robinson et al. | 83/448 |
| 5,058,474 A | * | 10/1991 | Herrera | 144/253.6 |
| 5,143,130 A | * | 9/1992 | Bonyman | 144/253.6 |
| 5,171,003 A | * | 12/1992 | Kull | 269/166 |
| 5,443,246 A | * | 8/1995 | Peterson | 269/166 |

FOREIGN PATENT DOCUMENTS

| | | | | |
|---|---|---|---|---|
| DE | 36747 | * | 8/1886 | 144/250.15 |

* cited by examiner

*Primary Examiner*—W. Donald Bray
(74) *Attorney, Agent, or Firm*—Harry I. Leon; Vivian L. Steadman

(57) ABSTRACT

A pair of holding arms which can be installed quickly and used to press a workpiece in a safe manner against a guide fence, regardless of the cuts made upon it, when the workpiece is moved past a shaper having cutter blades rotatably mounted on a stationary shaft. Each holding arm includes a rubber-faced roller, an elongated, solid rod of angular transverse cross-section, and a track-mounted post for supporting the rod in a horizontal position. Contact between the workpiece and the holding arm is made through the roller which is vertically mounted on one end of the rod. The post includes a clutch plate for locking the horizontal extension of the rod. Each roller can be quickly moved forward into contact with the workpiece without releasing the clutch plate. To move the roller backward—away from the workpiece, the user releases the clutch plate with one hand and pulls backward on the rod with the other. The roller is mounted on a shaft which is spring-loaded in such a way that the roller, when positioned contiguous with the workpiece, is constantly pushed against it. In addition, each post includes a foot which is mounted on a track disposed parallel to the guide fence so that the spacing between each holding arm and the cutter blades can be adjusted.

5 Claims, 4 Drawing Sheets

US 6,568,441 B2

HOLDING ARMS FOR SHAPER CUTTING AND THE LIKE

CROSS REFERENCE TO RELATED U.S. PATENT APPLICATION

This application is a continuation-in-part of U.S. provisional patent application Ser. No. 60/281,835, filed Apr. 5, 2001.

BACKGROUND OF THE INVENTION

In cutting wood, plastic or metals with a router or shaper, the workpiece is moved past cutter blades rotatably mounted on a vertical shaft. As practised in the prior art, this operation is inherently dangerous, especially when narrow molding pieces must be machined, because the worker has to hold the workpiece as it is being moved past the cutter blades. Generally, the less shoulder height a workpiece has, the closer a user's hands tend to be to the blades. The potential for serious injury jumps dramatically in those cases in which that portion of the workpiece used as a guide surface defines, once the workpiece has been cut, only a very narrow shoulder. To overcome these hazards, special holding fixtures, custom-designed for each job, have been used in the prior art.

SUMMARY OF THE INVENTION

The object of the present invention is to provide a device which can be installed quickly and used to hold a workpiece in a safe manner, regardless of the cuts made upon it, so that longstanding needs in the art of shaping can be met.

It is a further object of this invention to provide such a device which is relatively inexpensive to manufacture and which can be used to improve the competitive edge of small production shops.

In accordance with the present invention, there is provided at least two holding arms including a pair of rubber-faced rollers, each roller being rotatably mounted on a vertical shaft held above a shaper table. Spaced apart from each other, the rollers are used to hold an elongated workpiece against the table's guide fence.

Means for adjusting the position of each roller relative to the guide fence includes at least one elongated solid metal rod and a post in which the rod, once it has been slip-fitted therein, is held in a horizontally extended position above the shaper table. Sized to have a length in excess of the transverse width of the shaper table, the rod defines a forked end to which is rigidly attached a yoke for supporting the roller shaft. In the preferred embodiment, the metal rod, in tranverse cross-section, generally defines an imaginary square.

The post itself terminates downwardly in a foot which is slideably mounted on a track which defines a tee slot. Affixed to the shaper table, the track is secured thereto in such a way that the tee slot runs approximately parallel to the longitudinal centerline of the guide fence.

Posts can be individually moved along the track and then locked in place prior to use. Moreover, a table setup can be provided in which more than one set of shaper blades are arrayed in a sequence; and additional arms, whose posts are anchored in the same tee slot, hold the workpiece before and after each set. The locking means used to hold each post in place relative to the track is a pinch bolt which presses the foot of the post against portions thereof defining the top edges of the tee slot.

A spring-actuated locking means secured to each post prevents the respective arm held therein from moving, once the horizontal extension of the arm has been set, relative to the post. The locking means includes, in addition to the spring, at least one clutch plate encircling the rod held in that particular post. The spring, when compressed, allows the rod to be slid backward relative to the workpiece; when released, the spring presses edges of the clutch plate against the rod, locking it in position. However, the clutch plate allows the rod to be slid forward without compressing the spring. The end of the rod distal from the roller terminates in a handle which the user can grasp to facilitate sliding the rod relative to the post, as well as to move the post along the track.

In most applications, two holding arms according to the present invention are adequate for holding a workpiece as it is being machined by a shaper. Initially, the rubber-faced roller on the first arm is used to press an uncut portion of the workpiece against the shaper fence. As soon as the workpiece has been moved past the shaper blades, the rubber-faced roller on the second arm is advanced until it pushes a cut section of the workpiece against the guide fence. The position of the second rubber-faced roller can be adjusted in seconds to accommodate cut sections having different shapes.

The applicant has used the present invention in his own small production shop with great success.

DETAILED DESCRIPTION OF THE PREFERRED EMBODIMENT

Figure 1:
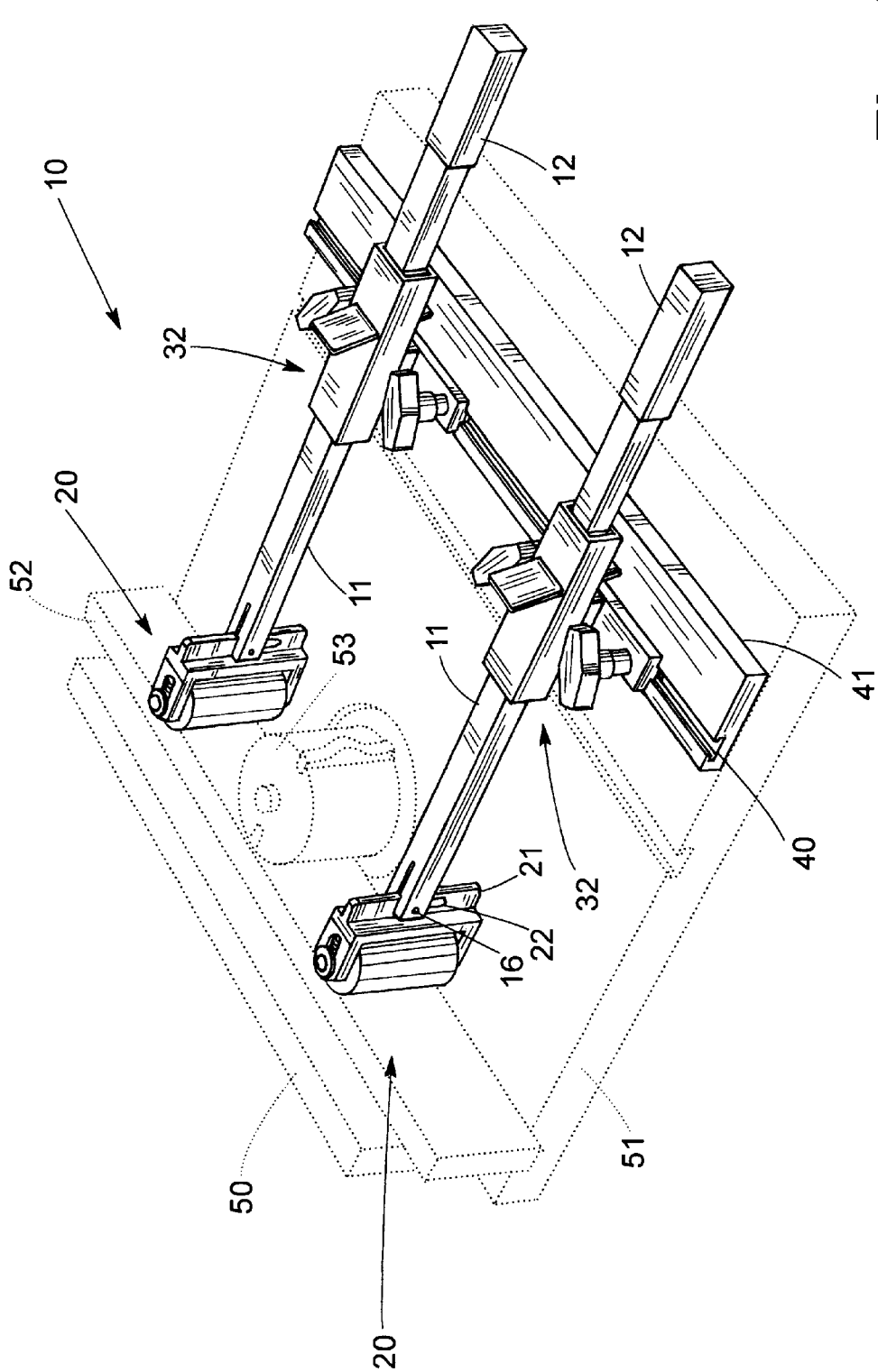
FIG. 1 is a top perspective view of a pair of holding arms according to the present invention, rollers mounted on the arms being deployed in positions which are useful in holding a workpiece, both before and after the shaper cutter, against the guide fence; the workpiece, guide fence, shaper cutter, and shaper table being illustrated in dashed lines and forming no part of the invention.
Figure 2:
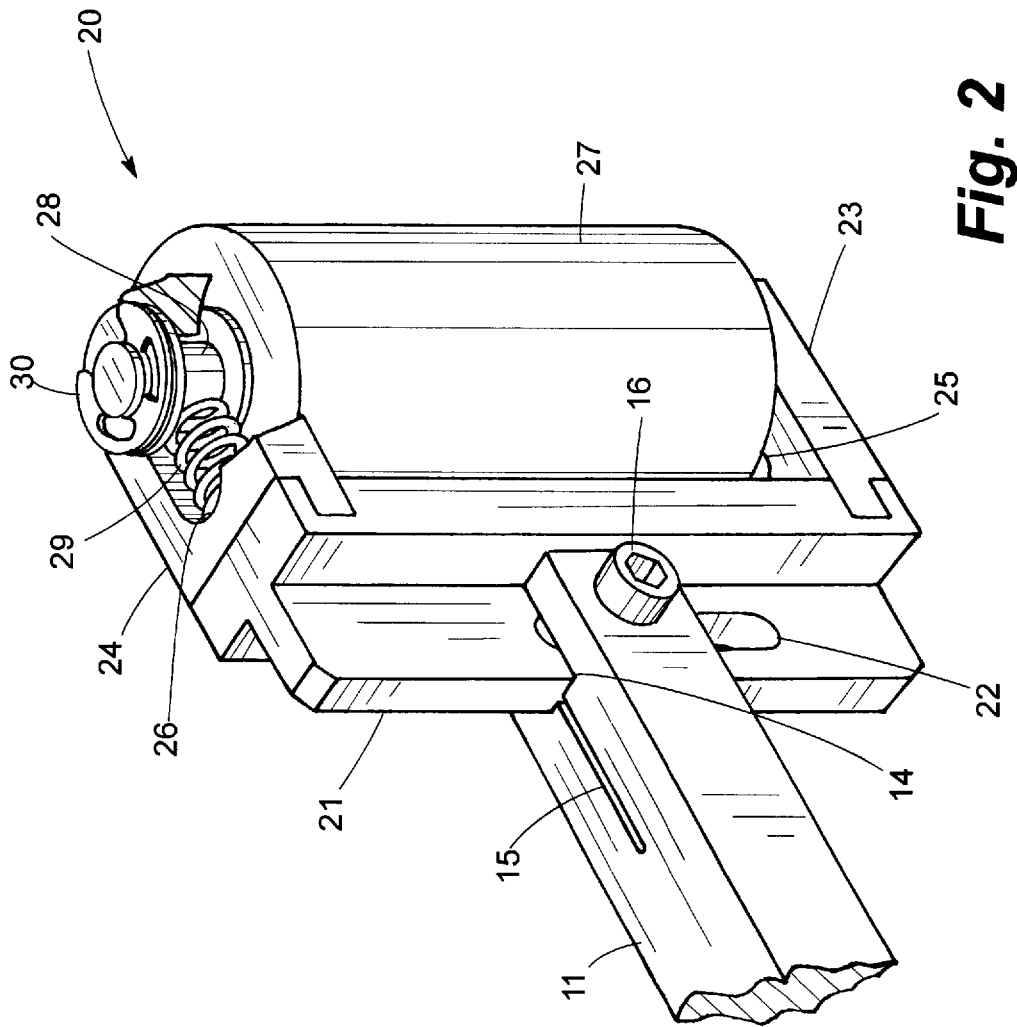
FIG. 2 is a perspective view, on an enlarged scale, of a fragmentary portion of one of the holding arms according to FIG. 1, a breakout section of a roller support plate therein showing a compression spring used to bias the respective roller towards the guide fence.

In the drawings, a pair of holding arms is indicated generally by the reference numeral 10. Each arm comprises an elongated rod 11, a track-mounted post 32 for positioning the rod relative to a guide fence 50 on a shaper table 51, and a roller assembly 20 including a roller 27 (FIGS. 1 and 2). The rod 11 is preferably a solid aluminum piece having an angular transverse cross-section and measuring, by way of example, ¾ inches on a side when said cross-section is square in outline. Alternately, the rod 11 can be fabricated from another metal or even plastic.

Rotatably mounted between support plates 23, 24 secured to a yoke 21 which is affixed to one end of the rod 11, the roller 27 is used to push a workpiece 52 against the guide fence 50. In use, a pair of holding arms with first and second rollers 27 are disposed on either side of a shaper blade 53, causing the workpiece 52 to come into contact, before the blade can cut it, with the first roller, and then, after the workpiece has been machined, with the second roller.

The end of the rod 11 to which the yoke 21 is affixed includes a pair of spaced apart forks, which together define a groove 14. In addition, each of the forks defines a hole oriented horizontally and perpendicularly to the centerline of the rod. Spaced apart by a distance which is only slightly greater than the thickness of the yoke 21 so that it can be slip-fitted between them, the forks are held in assembled relation with the yoke by a bolt 16. Inserted into said hole in each respective fork, as well as into an elongated opening 22 formed in the yoke 21, the bolt 16 is tightened, narrowing a relief slot 15 which extends longitudinally from the groove 14, until the forks squeeze firmly against the yoke (FIG. 2).

Disposed perpendicularly to the yoke 21 are roller support plates 23, 24, which define elongated apertures 25, 26, respectively (FIG. 2). Distal ends of a shaft 28, about which the roller 27 rotates, penetrate these apertures and are held in place, relative to the plates 23, 24, by fasteners 30 (FIG. 2). Means for keeping a constant pressure on the workpiece 52 as it moves along the guide fence 50 includes at least one compression spring 29 which pushes the roller 27 against the workpiece. In the preferred embodiment, the roller 27 is covered with rubber or the like to protect workpiece surfaces as they are being shaped.

Figure 3:
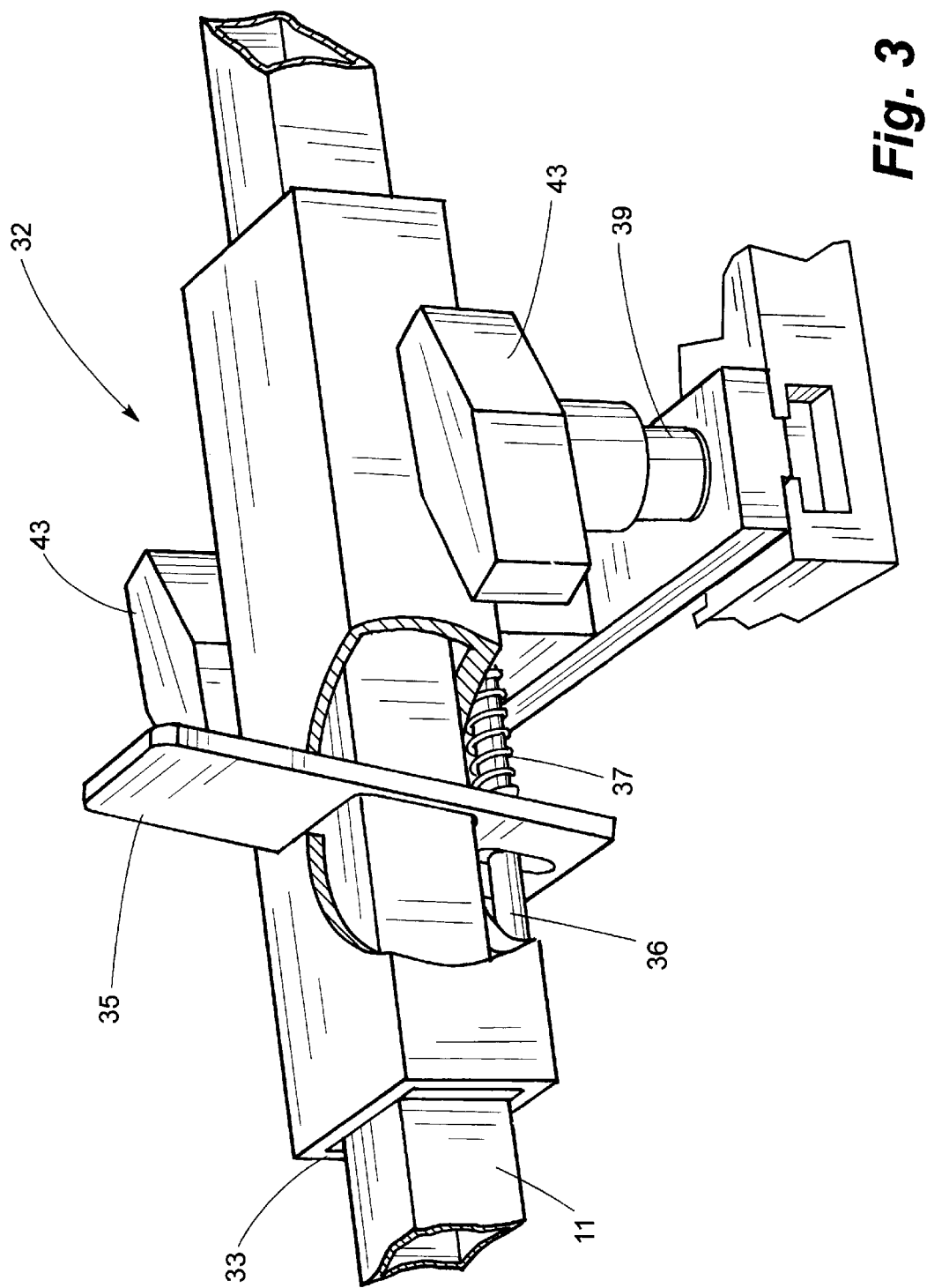
FIG. 3 is a perspective view, on an enlarged scale, of a fragmentary portion of one of the holding arms according to FIG. 1, a breakout section of a post therein showing a spring-actuated locking mechanism for adjusting the horizontal extension of the arm.

Supported and locked in position by the track-mounted post 32, each elongated rod 11 can be both extended perpendicularly to the longitudinal centerline of the workpiece 52 and shifted sideways parallel thereto, by manipulating handle 12 (FIG. 1). The post 32 defines an hollow mounting section 33 with an elongated, open ended channel which, in use, is disposed horizontally (FIG. 3). Slip-fitted into the open ended channel, the rod 11 is held securely in position by a clutch assembly.

The clutch assembly includes a clutch plate 35 having an aperture for receiving the rod 11, a guide 36, and a compression spring 37. To disengage it, one moves an upper portion of the clutch plate 35 slightly backward, releasing the arm 11 so that it can be slid away from the guide fence 50. When the clutch plate 35 is subsequently engaged, pressure exerted by the spring 37 jams the plate against the arm 11, holding it fixed in position. However, the clutch plate 35 allows the rod 11 to be slid forward without compressing the spring 37.

Figure 4:
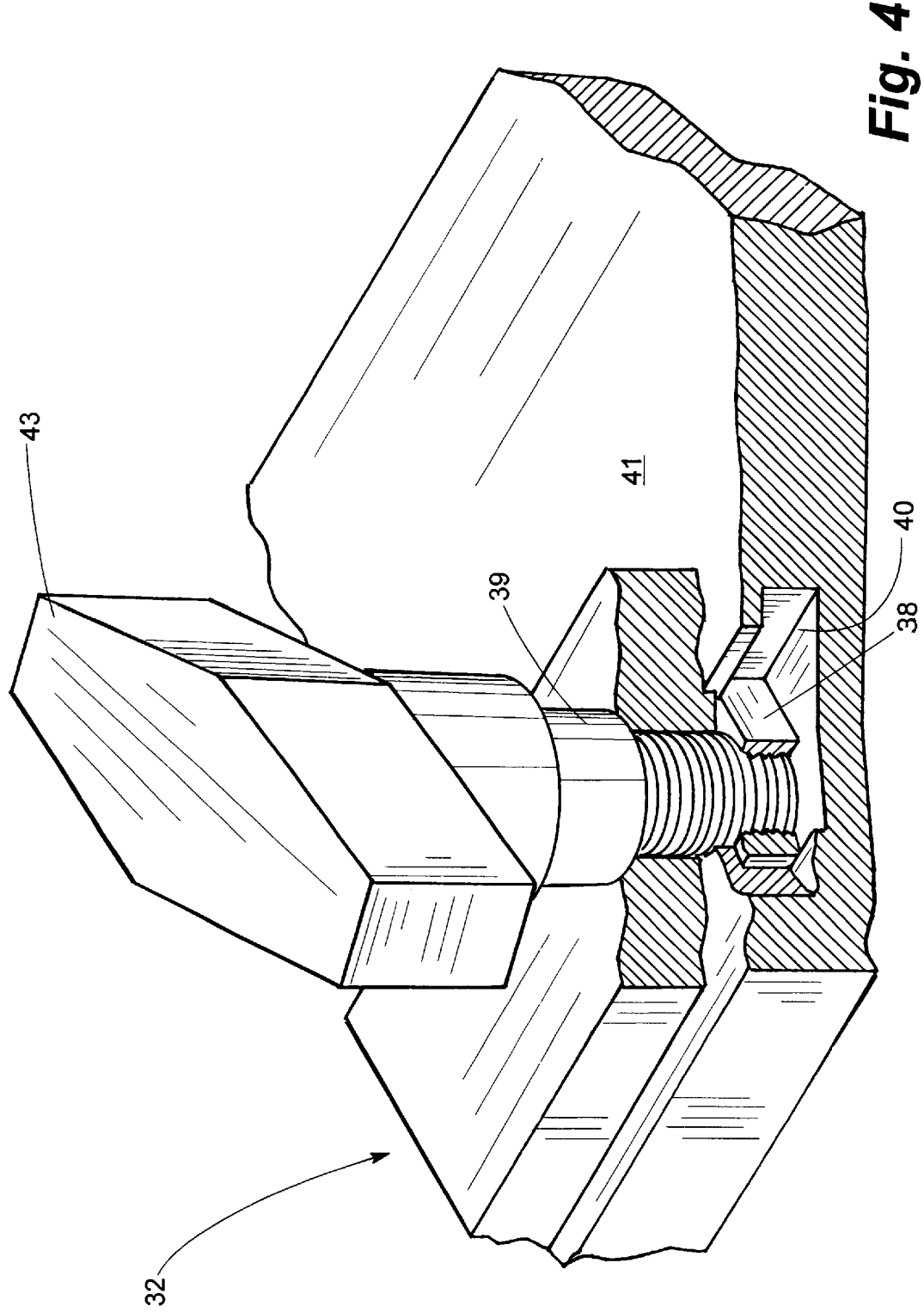
FIG. 4 is a perspective view, on a further enlarged scale, of a fragmentary portion of one of the holding arms according to FIG. 1, a breakout section of a track defining a tee slot therein showing a pinch bolt which presses the foot of the post against the track.

Means for moving the post 32 parallel to the longitudinal centerline of the workpiece 52 includes a track 41. Secured to the shaper table 51 with c-clamps (not shown) or the like, the track 41 defines a tee slot 40 (FIGS. 1, 3 and 4). The post 32 includes a foot which is secured to the track 41 by at least two locking bolts 39, each of which is held in place by a nut 38 sized to ride in the tee slot 40 (FIG. 4). When the bolt 39 is tightened, bolt head 43 wedges portions of the track 41 defining the tee slot 40 between the nut 38 and a spacer 39, which is preferably made of a resilient plastic or the like (FIG. 4).

Figure 5:
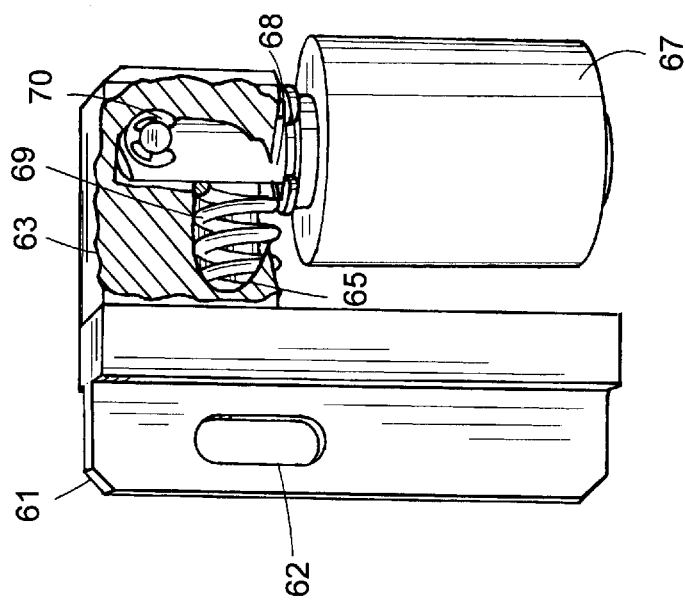
FIG. 5 is a side elevation view of a roller and a fragmentary portion of a roller support bracket in an alternate embodiment of a holding arm according to FIG. 1, a breakout section of the roller support bracket showing a compression spring used to wedge the workpiece between the respective roller and the guide fence.

An alternate roller assembly includes a roller 67 which rotates about a shaft 68, one end of which is unattached to any support structure, thereby providing a cantilevered roller for holding a workpiece 52 when such a configuration is more suitable for a particular task (FIG. 5). Distal from its free end, the shaft 68 is held within a support member 63 by a fastener 70. Affixed to the support member 63 is a web 61 with an elongated opening 62 which extends generally parallel to the shaft 68. Like the roller 20 assembly, the alternate roller assembly is secured to the rod 11 by a bolt 16, which holds the forks of the rod as well as the web 61 in assembled relation. The support member 63 itself defines a slot 65 which extends perpendicularly to the shaft 68 for receiving a compression spring 69. The spring 69 comprises means for applying a constant pressure to the workpiece 52, pushing it against the guide fence 50. Preferably, the roller 67, like the roller 27, is covered with rubber or the like to protect workpiece surfaces.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A holding arm for pushing a workpiece against a guide fence, while the workpiece is being machined, comprising:
   (a) an elongated rod;
   (b) means for holding the rod in such a way that its longitudinal centerline Is held perpendicularly to said guide fence;
   (c) at least one clutchplate connected to the rod holding means, the clutch plate locking the rod in position, during use, relative to the guide fence;
   (d) a roller and a shaft on which the roller is rotatably mounted, the shaft being disposed perpendicularly to the longitudinal centerline of the rod;
   (e) a support connected to one end of the rod, the support defining at least one aperture for slideably receiving one end of the shaft, the shaft being spring-biased to move said end laterally within the aperture towards the guide fence; and
   (f) means for holding the shaft and the support in assembled relation when said end of the shaft is slideably received within the aperture.

2. The holding arm according to claim 1, wherein the rod holding means includes a post and a track, the track defining a tee slot which extends parallel to said guide fence, the post having a foot which engages the tee slot so as to releasably attach the post to the track.

3. A holding arm for pushing a workpiece against a guide fence, while the workpiece is being machined, comprising:
   (a) an elongated rod;
   (b) a post for holding the rod in such a way that its longitudinal centerline is held perpendicularly to said guide fence;
   (c) means, connected to the post, for releasably adjusting position of the rod relative to the guide fence;
   (d) a roller; and
   (e) means for rotatably supporting the roller, the supporting means including a stationary portion connected to one end of the elongated rod and further including a shaft on which the roller is rotatably mounted, the shaft being disposed perpendicularly to the longitudinal centerline of the elongated rod, the shaft being spring-biased to move laterally and partially within said stationary portion, towards the guide fence.

4. The holding arm according to claim 3, wherein the means for releasably adjusting the position of the rod further comprises a clutch plate connected to the post, the clutch plate defining an aperture through which the rod can be slid, so that the roller can be quickly moved into position by simultaneously releasing the clutch plate and sliding the rod in such a way as to bring the roller into contact with the workpiece.

5. A holding arm for pushing a workpiece against a guide fence, while the workpiece is being machined, comprising:

(a) an elongated rod;

(b) means for holding the rod in such a way that its longitudinal centerline is held perpendicularly to said guide fence;

(c) a roller and a shaft on which the roller is rotatably mounted, the shaft being disposed perpendicularly to the longitudinal centerline of the rod;

(d) a support connected to one end of the rod, the support defining at least one passageway for slideably receiving one end of the shaft, the shaft being spring-biased to move said end laterally within the passageway towards the guide fence; and (e) means for holding the shaft and the support in assembled relation when said end of the shaft is slideably received within the passageway.

* * * * *